(12) United States Patent
Che et al.

(10) Patent No.: US 7,821,736 B2
(45) Date of Patent: Oct. 26, 2010

(54) SHAPED TRAILING SHIELD OF A PERPENDICULAR RECORDING WRITE ELEMENT

(75) Inventors: Xiaodong Che, Saratoga, CA (US); Wen-Chien Hsiao, San Jose, CA (US); Yimin Hsu, Sunnyvale, CA (US); Vladimir Nikitin, Campbell, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 728 days.

(21) Appl. No.: 11/399,548

(22) Filed: Apr. 6, 2006

(65) Prior Publication Data

US 2007/0236831 A1  Oct. 11, 2007

(51) Int. Cl.
*G11B 5/127* (2006.01)
(52) U.S. Cl. .................................. 360/125.04
(58) Field of Classification Search ............ 360/125.03, 360/125.3, 128, 319, 122, 125.04
See application file for complete search history.

(56) References Cited

U.S. PATENT DOCUMENTS

| | | | |
|---|---|---|---|
| 5,075,956 A | 12/1991 | Das | |
| 6,034,847 A | 3/2000 | Komuro et al. | |
| 6,304,415 B1 | 10/2001 | Tateyama et al. | |
| 6,305,072 B1 | 10/2001 | Yoda et al. | |
| 6,668,442 B2 | 12/2003 | Sasaki | |
| 6,680,832 B2 | 6/2004 | Fontana, Jr. et al. | |
| 6,950,277 B1 | 9/2005 | Nguy et al. | |
| 6,965,494 B2 * | 11/2005 | Campbell et al. | 360/125.04 |
| 7,054,105 B2 * | 5/2006 | Mochizuki et al. | 360/125.03 |
| 7,196,871 B2 * | 3/2007 | Hsu et al. | 360/125.03 |
| 7,436,628 B2 * | 10/2008 | Kameda et al. | 360/125.1 |
| 7,440,230 B2 * | 10/2008 | Hsu et al. | 360/125.3 |
| 2005/0041337 A1 | 2/2005 | Yazawa et al. | |
| 2005/0122622 A1 | 6/2005 | Maruyama et al. | |
| 2005/0259355 A1* | 11/2005 | Gao et al. | 360/125 |

FOREIGN PATENT DOCUMENTS

JP  10-154313  9/1998

* cited by examiner

*Primary Examiner*—Angel A. Castro
(74) *Attorney, Agent, or Firm*—Duft Bornsen & Fishman, LLP

(57) ABSTRACT

Write elements are discussed having a write pole and an associated trailing shield. A leading side of the trailing shield faces a trailing side of the write pole. The leading side of the trailing shield has a shape such that a center portion of the leading side has less of a separation from the trailing side of the write pole than track edge portions of the leading side of the trailing shield. An exemplary shape the leading side of the trailing shield may be a convex shape when viewed from the ABS. The shape of the leading side of the trailing shield causes the trailing shield to shunt less of the magnetic field from the trailing side of the write pole at the track edges so that the written transition at the track edge will not lag behind the written transition at the track center allowing for a straighter transition.

12 Claims, 7 Drawing Sheets

SHAPED TRAILING SHIELD OF A PERPENDICULAR RECORDING WRITE ELEMENT

RELATED APPLICATIONS

This patent application is related to a co-pending patent application having the Ser. No. 11/286,077 filed on Nov. 23, 2005, which is incorporated herein by reference.

BACKGROUND OF THE INVENTION

1. Field of the Invention

The invention is related to the field of magnetic disk drive systems and, in particular, to a write element having a shaped trailing shield to improve transition curvature. More particularly, the shape of the trailing shield reduces shunting of the magnetic field by the trailing shield at the track edges to improve transition curvature.

2. Statement of the Problem

Magnetic disk drive systems typically include a magnetic disk, a recording head having write and read elements, a suspension arm, and an actuator arm. As the magnetic disk is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic disk where signal fields are written to and read by the write and read elements, respectively. The write and read elements are connected to processing circuitry that operates according to a computer program to implement write and read functions.

Magnetic disk drives have typically been longitudinal magnetic recording systems, wherein magnetic data is recorded as magnetic transitions formed longitudinally on a disk surface. The surface of the disk is magnetized in a direction along a track of data and then switched to the opposite direction, both directions being parallel with the surface of the disk and parallel with the direction of the data track.

Unfortunately, data density requirements are fast approaching the physical limits. Overall data density (or areal density) may be improved by improving linear density and/or track density. To improve linear density, bit sizes on a track need to be reduced which in turn requires decreasing the grain size of the magnetic medium. As this grain size shrinks, the magnetic field required to write a bit of data increases proportionally. The ability to produce a magnetic field strong enough to write a bit of data using conventional longitudinal write element technologies is reaching its physical limit.

One way to achieve higher density recordings is with perpendicular recording. In perpendicular recording systems, bits of data are recorded magnetically perpendicular to the plane of the surface of the disk. The magnetic disk may have a relatively high coercivity material at its surface and a relatively low coercivity material just beneath the surface. A write pole having a small cross section and very high magnetic flux emits a strong, concentrated magnetic field perpendicular to the surface of the disk. This magnetic field emitted from the write pole is sufficiently strong to overcome the high coercivity of the surface material and magnetize it in a direction perpendicular to its surface. The magnetic flux then flows through the magnetically soft underlayer (SUL) and returns to the surface of the disk at a location adjacent to a return pole of the write element. The return pole of the write element typically has a cross section that is much larger than that of the write pole so that the magnetic flux through the disk at the location of the return pole (as well as the resulting magnetic field between the disk and return pole) is sufficiently spread out to render the magnetic flux too weak to overcome the coercivity of the disk surface material. In this way, the magnetization imparted by the write pole is not erased by the return pole.

FIG. 1 illustrates a typical write element 100 adapted to write to a perpendicular magnetic recording medium 120. Write element 100 generally includes a yoke 101 comprising a write pole 102 and a return pole 104. Write element 100 also includes a coil wrapped around yoke 101 that is not shown. Perpendicular magnetic recording medium 120 includes a perpendicular magnetic recording layer 122 and a soft underlayer (SUL) 124.

When in operation, perpendicular magnetic recording medium 120 spins from left to right in FIG. 1. A magnetic flux is generated in yoke 101 due to an electrical current flowing through the coil (not shown). The magnetic flux flows through write pole 102, and write pole 102 emits a magnetic field across the write gap into perpendicular magnetic recording medium 120. The magnetic flux then flows through the SUL 124 and returns to the surface of the disk at a location adjacent return pole 104.

As the magnetic field from write pole 102 passes through perpendicular magnetic recording layer 122, the perpendicular component of the magnetic field influences the magnetization orientation of the perpendicular magnetic recording layer 122 in the direction of the magnetic field. The magnetization orientation of three bits in perpendicular magnetic recording layer 122 is illustrated as single arrows pointing up or down in FIG. 1. The areas between bits are referred to as transitions 128, which will be discussed in more detail below.

When write element 100 is writing to perpendicular magnetic recording medium 120, write pole 102 has a leading side 106, a trailing side 107, and two track sides. The two track sides are the opposite sides parallel to the page of FIG. 1, and are not shown with a reference number. Recording generally takes place from the trailing side 107 and the two track sides of write pole 102. No recording generally takes place from the leading side 106 of write pole 102. To prevent writing to neighboring tracks, side shields may be added proximate to the two track sides, which are not shown in FIG. 1. To prevent writing to neighboring bits along the track, a trailing shield 108 may be added proximate to the trailing side 107 of write pole 102. The shields shunt some of the magnetic field from write pole 102.

FIG. 2 illustrates write pole 102 and trailing shield 108 as viewed from the ABS of write element 100. Trailing shield 108 has a leading side 202 that faces the trailing side 107 of write pole 102. Leading side 202 of trailing shield 108 is separated from trailing side 107 of write pole 102 by a desired gap, such as 50 nm. The purpose of trailing shield 108 is to shunt the low frequency components of the magnetic field emitting from trailing side 107 of write pole 102. Because trailing side 107 of write pole 102 is primarily responsible for recording, trailing shield 108 helps to sharpen the field gradient of the magnetic field. The dotted line in FIG. 2 illustrates a representation of the field contour 210 of the magnetic field generated by write pole 102 and trailing shield 108 as viewed from the ABS.

Trailing side 107 of write pole 102 defines the track width of write element 100. The track edges are illustrated between write pole 102 and trailing shield 108 as right angles in FIG. 2. As is evident in FIG. 2, the field contour 210 generated by the configuration in FIG. 2 is curved at the track edges. The curvature of the field contour 210 at the track edges unfortunately results in a curvature in the transitions between bits in perpendicular magnetic recording medium 120.

FIG. 3 is a top view of a portion of a track 302 on perpendicular magnetic recording medium 120. Due to the shape of the field contour 210 generated by write element 100, the transitions 128 between bits are curved. Also shown in FIG. 3 is an example signal 304 read from track 302. The curved transitions 128 cause problems. For one, the signal 304 read back from track 302 having curved transitions has a lower amplitude A1 than a signal read from straight transitions, which reduces the overall signal to noise ratio (see also FIG. 8). Also, the signal 304 read back from track 302 having curved transitions has wider pulse widths than a signal read from straight transitions, which limits how close the transitions can be packed together to provide high density recording (see also FIG. 8).

SUMMARY OF THE SOLUTION

The invention solves the above and other related problems with a shaped trailing shield that sharpens the field contour of the magnetic field emitted from the write pole, especially at the track edges, to reduce the curvature of the transitions between bits. The straighter transitions advantageously allow for a higher amplitude on the read back signal, and a sharper, narrow-pulse read back signal. The higher amplitude on the read back signal is more tolerant to other noise, such as disk noise and electronic noise. The sharper read back signal allows for more transitions to be packed closer together, which allows for higher-density recording.

One embodiment comprises a write element for writing to a perpendicular magnetic recording medium. The write element includes a write pole having a trailing side proximate to an air bearing surface (ABS) of the write element, and a trailing shield having a leading side proximate to the ABS that faces the trailing side of the write pole. The leading side of the trailing shield has a shape such that a center portion of the leading side of the trailing shield has less of a separation from the trailing side of the write pole than track edge portions of the leading side of the trailing shield. By having the track edge portions of the leading side of the trailing shield further away from the trailing side of the write pole, the track edge portions of the trailing shield shunt less of the magnetic field at the track edges. This advantageously sharpens the field contour of the magnetic field at the track edges to reduce transition curvature. The less shunting at the track edge compensates for weak writing at the track edge, and the written transition at the track edge will not lag behind the written transition at the track center. This results in a straighter written transition which is beneficial for high data rate recording.

Another embodiment comprises another write element for writing to a perpendicular magnetic recording medium. The write element includes a write pole having a trailing side proximate to the ABS of the write element, and a trailing shield having a leading side proximate to the ABS that faces the trailing side of the write pole. The leading side of the trailing shield has a shape such that a portion of the leading side of the trailing shield has a substantially convex shape when viewed from an ABS of the write element. The leading side has a convex shape within a track width that is defined by the trailing side of the write pole.

The invention may include other exemplary embodiments described below.

DESCRIPTION OF THE DRAWINGS

The same reference number represents the same element on all drawings.

DETAILED DESCRIPTION OF THE INVENTION

FIGS. 4-11 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 4:
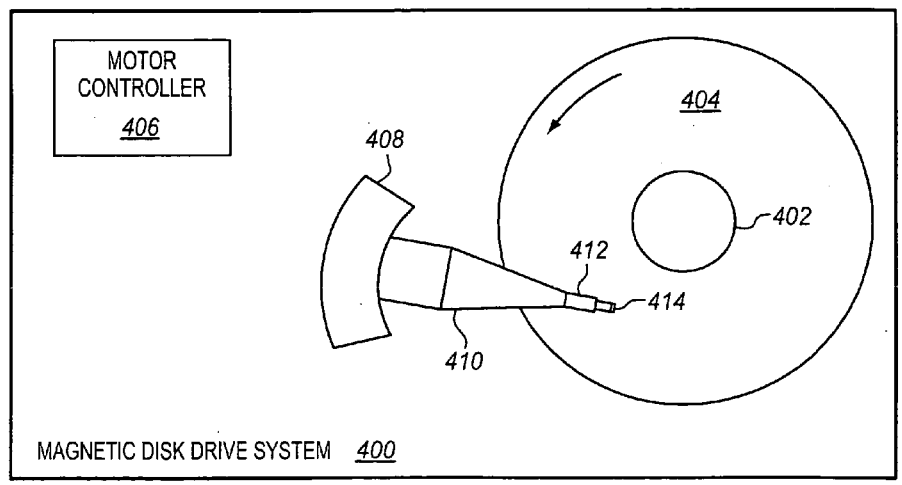
FIG. 4 illustrates a magnetic disk drive system in an exemplary embodiment of the invention.

FIG. 4 illustrates a magnetic disk drive system 400 in an exemplary embodiment of the invention. Magnetic disk drive system 400 includes a spindle 402, a perpendicular magnetic recording medium 404, a motor controller 406, an actuator 408, an actuator arm 410, a suspension arm 412, and a recording head 414. Spindle 402 supports and rotates a perpendicular magnetic recording medium 404 in the direction indicated by the arrow. A spindle motor (not shown) rotates spindle 402 according to control signals from motor controller 406. Recording head 414 is supported by suspension arm 412 and actuator arm 410. Actuator arm 410 is connected to actuator 408 that is configured to rotate in order to position recording head 414 over a desired track of perpendicular magnetic recording medium 404. Magnetic disk drive system 400 may include other devices, components, or systems not shown in FIG. 4. For instance, a plurality of magnetic disks, actuators, actuator arms, suspension arms, and recording heads may be used.

When perpendicular magnetic recording medium 404 rotates, an air flow generated by the rotation of magnetic disk 404 causes an air bearing surface (ABS) of recording head 414 to ride on a cushion of air at a particular height above magnetic disk 404. The height depends on the shape of the ABS. As recording head 414 rides on the cushion of air, actuator 408 moves actuator arm 410 to position a read element (not shown) and a write element (not shown) in recording head 414 over selected tracks of perpendicular magnetic recording medium 404.

The perpendicular magnetic recording medium 404 is shown as a disk in FIG. 4. However, a perpendicular magnetic recording medium as discussed can take on other forms in other embodiments.

Figure 5:
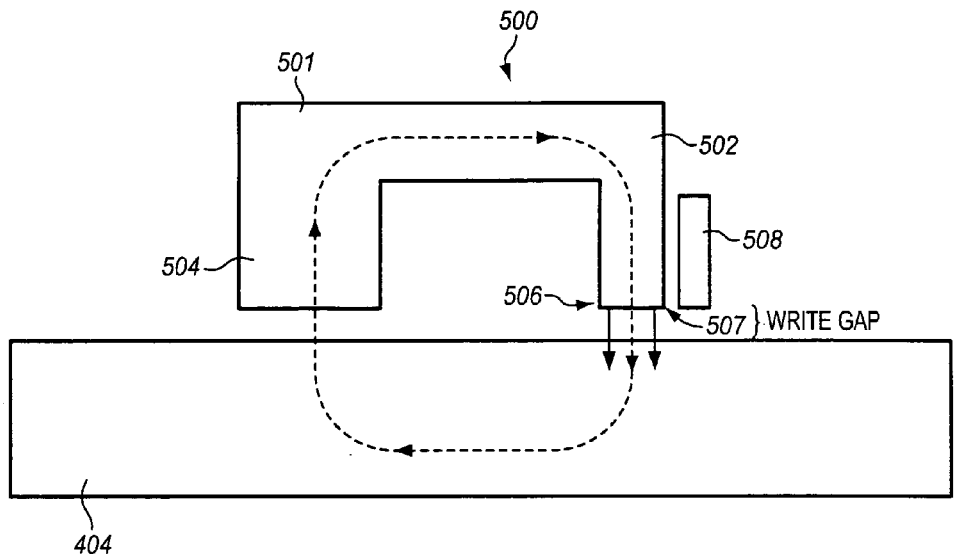
FIG. 5 illustrates a write element of a recording head in an exemplary embodiment.

FIG. 5 illustrates a write element 500 of recording head 414 in an exemplary embodiment. Write element 500 is adapted to write to perpendicular magnetic recording medium 404. Write element 500 generally includes a yoke 501 comprising a write pole 502 and a return pole 504. Write element 500 also includes a coil wrapped around yoke 501 that is not shown. Write pole 502 includes a leading side 506 and a trailing side 507. Write element 500 also includes a trailing shield 508 positioned proximate to trailing side 507 of write pole 502.

Write element 500 may take on other desired configurations in other embodiments.

Figure 6:
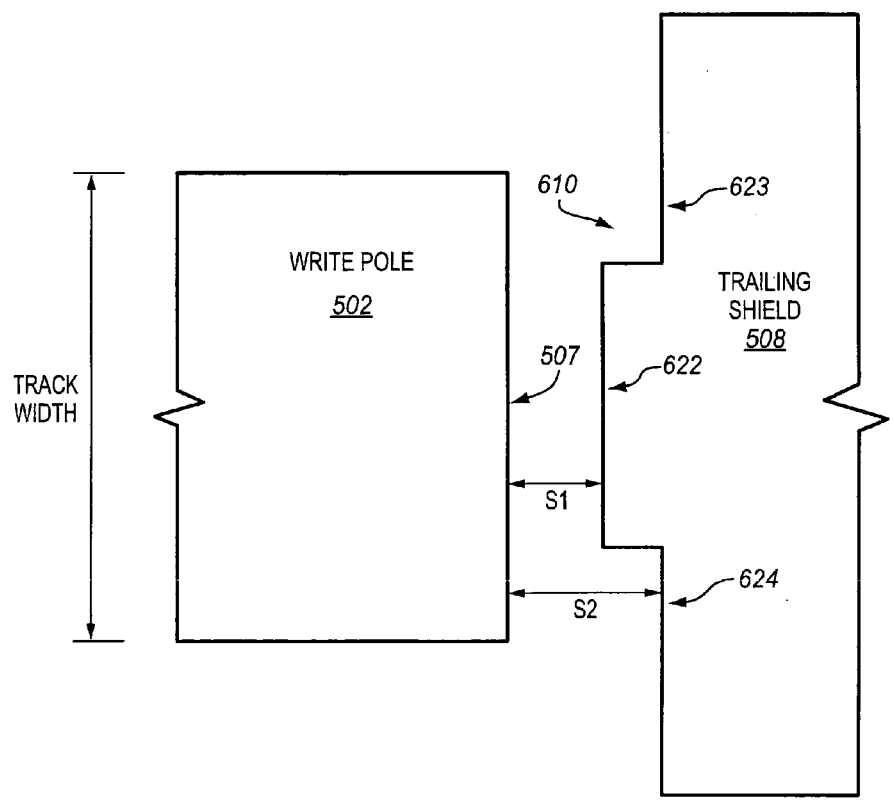
FIG. 6 illustrates a write pole and a trailing shield of the write element as viewed from the ABS of the write element in an exemplary embodiment.

FIG. 6 illustrates write pole 502 and trailing shield 508 of write element 500 as viewed from the ABS of write element 500 in an exemplary embodiment. As previously described, write pole 502 has trailing side 507 primarily responsible for writing to perpendicular magnetic recording medium 404. Trailing shield 508 includes a leading side 610 that is opposite to and faces trailing side 507 of write pole 502. Leading side 610 of trailing shield 508 has three portions that are of particular relevance for this discussion. Leading side 610 has a center portion 622 that comprises the portion of leading side 610 toward the center or middle of trailing shield 508. The width of the center portion 622 varies depending on desired implementations. Leading side 610 also has two track edge portions 623-624. Track edge portions 623-624 are the portions of trailing shield 508 toward the track edges, where the track width and track edges are defined by the width of trailing side 507 of write pole 502. Once again, the width of the track edge portions 623-624 varies depending on desired implementations.

Leading side 610 of trailing shield 508 has a shape such that the center portion 622 of leading side 610 has a separation S1 from trailing side 507 of write pole 502. Track edge portions 623-624 of leading side 610 each have a separation S2 from trailing side 507 of write pole 502 (although track edge portions 623-624 do not need to have the same separation). The separation S1 of the center portion 622 is less than the separation S2 of the track edge portions 623-624 due to the shape of leading side 610. By having track edge portions 623-624 further away from trailing side 507 of write pole 502, track edge portions 623-624 each shunt less of the magnetic field at the track edges as compared to previous trailing shields. Also, because track edge portions 623-624 each shunt less of the magnetic field from trailing side 507 of write pole 502 than center portion 622, write pole 502 generates a sharper field gradient. The less shunting at the track edge compensates for weak writing at the track edge, and the written transition at the track edge will not lag behind the written transition at the track center. This results in a straighter written transition which is beneficial for high data rate recording.

Because leading side 610 of trailing shield 508 mainly shunts the magnetic field at the ABS, the shape of leading side 610 as described herein generally refers to the shape of leading side 610 proximate to the ABS of write element 500. The shape of leading side 610 may be different away from the ABS where trailing shield 508 does not shunt the magnetic field.

Figure 7:
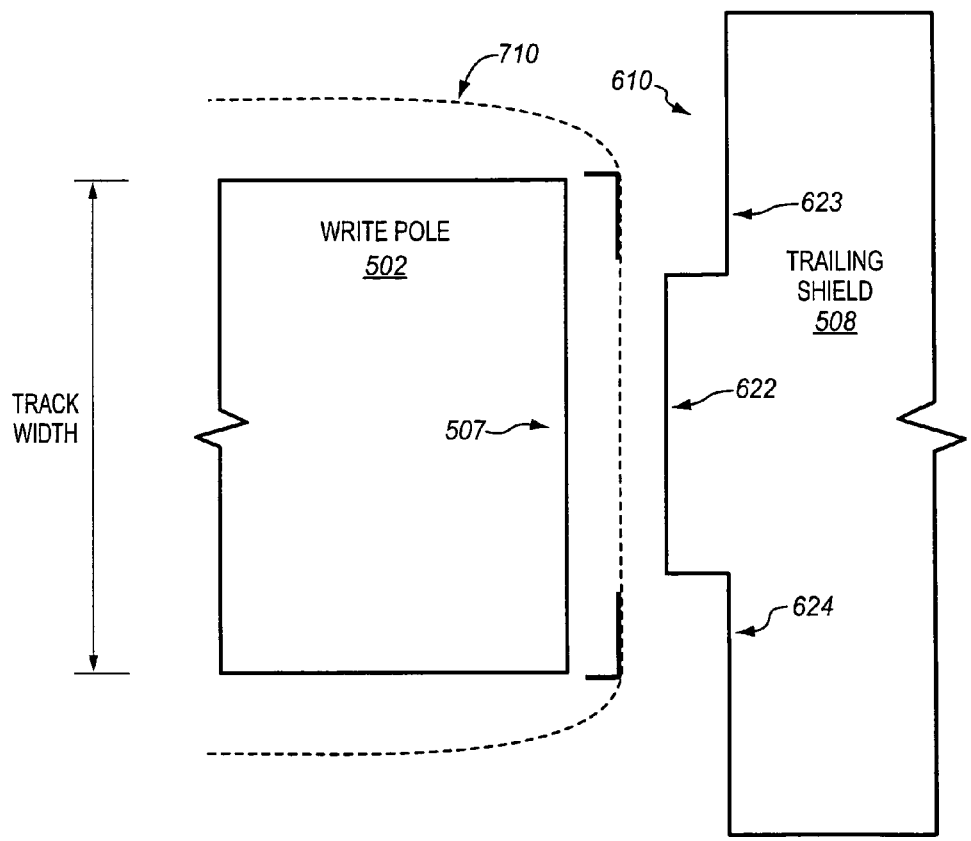
FIG. 7 illustrates a field contour generated by the write pole and the trailing shield in an exemplary embodiment.

FIG. 7 illustrates a field contour 710 generated by write pole 502 and trailing shield 508 in an exemplary embodiment. The dotted line in FIG. 7 illustrates a representation of the field contour 710 generated by write pole 502 and trailing shield 508 as viewed from the ABS. As previously stated, the width of trailing side 507 of write pole 502 defines the track width of write element 500. The track edges are illustrated between write pole 502 and trailing shield 508 as right angles in FIG. 7. As is evident in FIG. 7, the field contour 710 generated by the configuration in FIG. 6 is approximately right angles at the track edges. The sharper angles of the field contour 710 at the track edges advantageously reduce the curvature of the transitions between bits when the bits are written to perpendicular magnetic recording medium 404 (see FIGS. 4-5).

Figure 1:
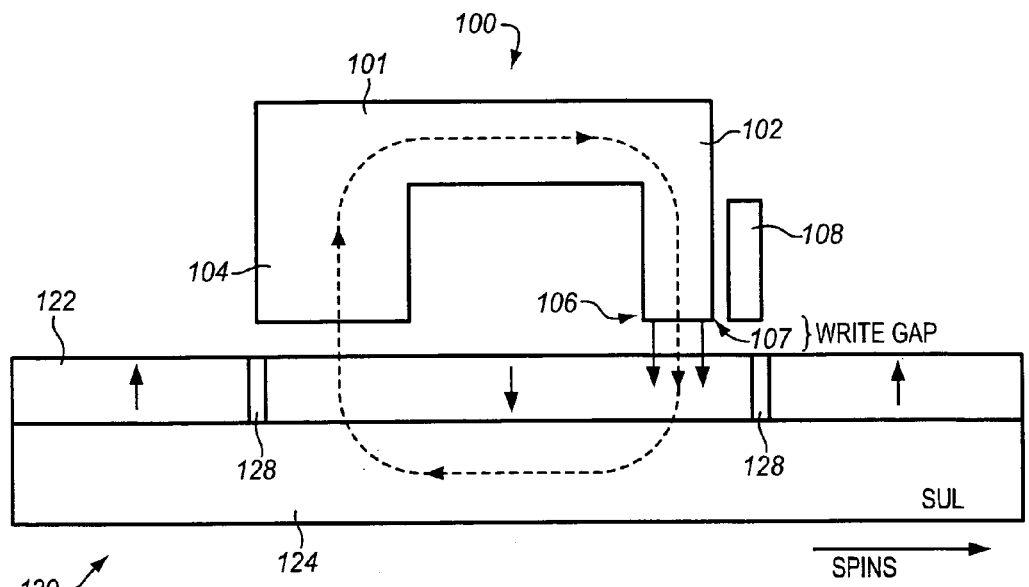
FIG. 1 illustrates a typical write element adapted to write to a perpendicular magnetic recording medium.
Figure 2:
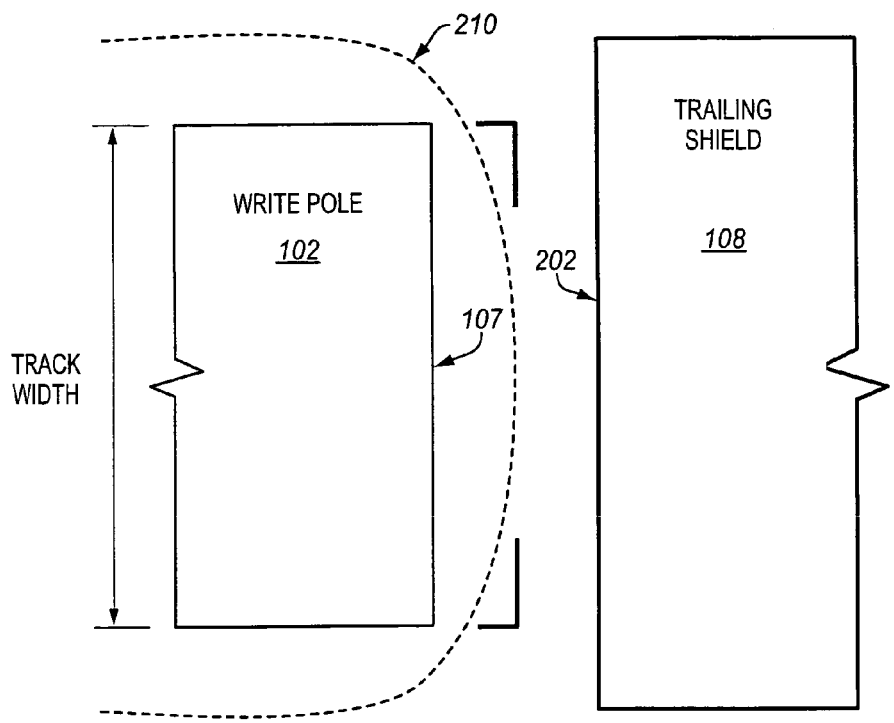
FIG. 2 illustrates a write pole and a trailing shield as viewed from the ABS of the write element of FIG. 1.
Figure 3:
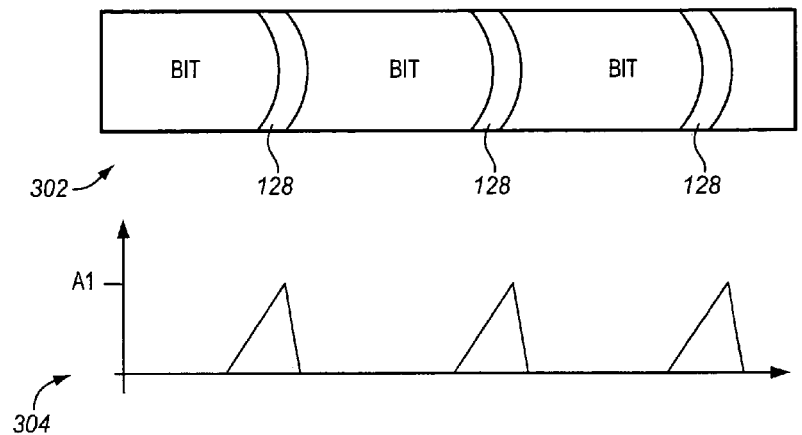
FIG. 3 is a top view of a portion of a track on a perpendicular magnetic recording medium.
Figure 8:
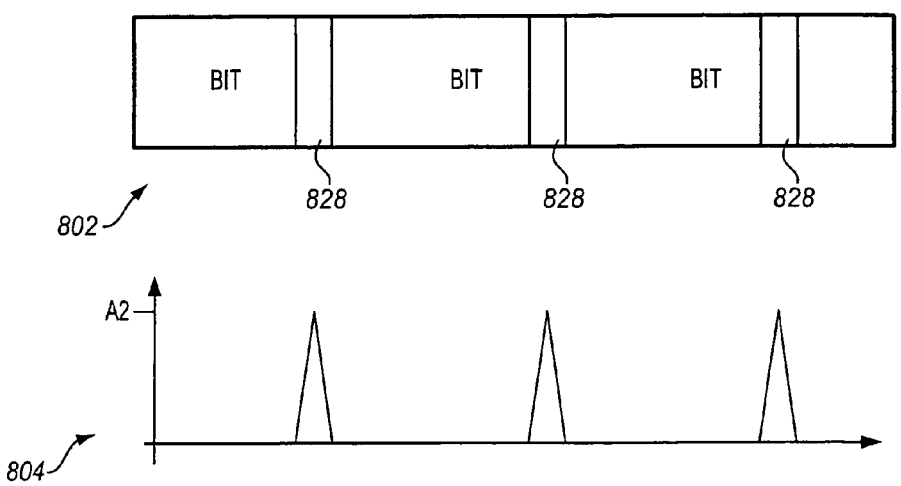
FIG. 8 is a top view of a portion of a track on a perpendicular magnetic recording medium in an exemplary embodiment.

FIG. 8 is a top view of a portion of a track 802 on perpendicular magnetic recording medium 404 in an exemplary embodiment. Due to the shape of the field contour 710 generated by write element 500, the transitions 828 between bits are no longer curved at the track edges as in FIG. 3, but are substantially straight at the track edges.

Also shown in FIG. 8 is an example signal 804 read from track 802. The signal 804 read back from track 802 has a higher amplitude A2 than the amplitude A1 of the signal 804 read back from track 302 in FIG. 3. The higher amplitude A2 on signal 804 is more tolerant to other noise, such as disk noise and electronic noise. Also, signal 804 is a sharper signal with a more narrow pulse as compared to signal 304 in FIG. 3. The sharper signal 804 allows for more transitions to be packed closer together, which allows for higher-density recording.

As stated above, the shape of leading side 610 of trailing shield 508 (see FIG. 6) may vary based on desired implementations and is not limited to the shape illustrated in FIG. 6. The following provides some alternative shapes of leading side 610 of trailing shield 508.

Figure 9:
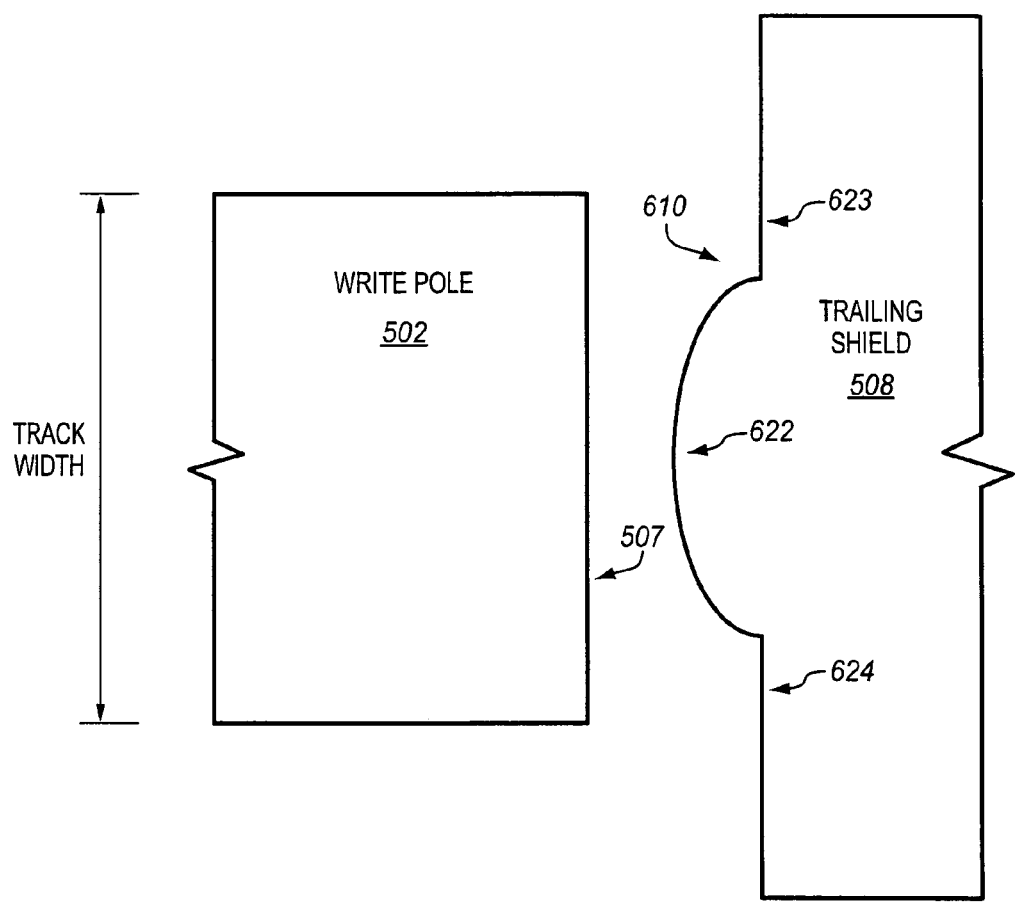
FIG. 9 illustrates a write pole and a trailing shield of a write element as viewed from the ABS of the write element in another exemplary embodiment.

FIG. 9 illustrates write pole 502 and trailing shield 508 of write element 500 as viewed from the ABS of write element 500 in another exemplary embodiment. In this embodiment, the shape of leading side 610 of trailing shield 508 is substantially convex when viewed from the ABS. The shape of leading side 610 is convex within the track width defined by trailing side 507 of write pole 502. According to the convex shape of leading side 610, center portion 622 of leading side 610 once again has less of a separation from trailing side 507 of write pole 502 than track edge portions 623-624 of leading side 610.

Figure 10:
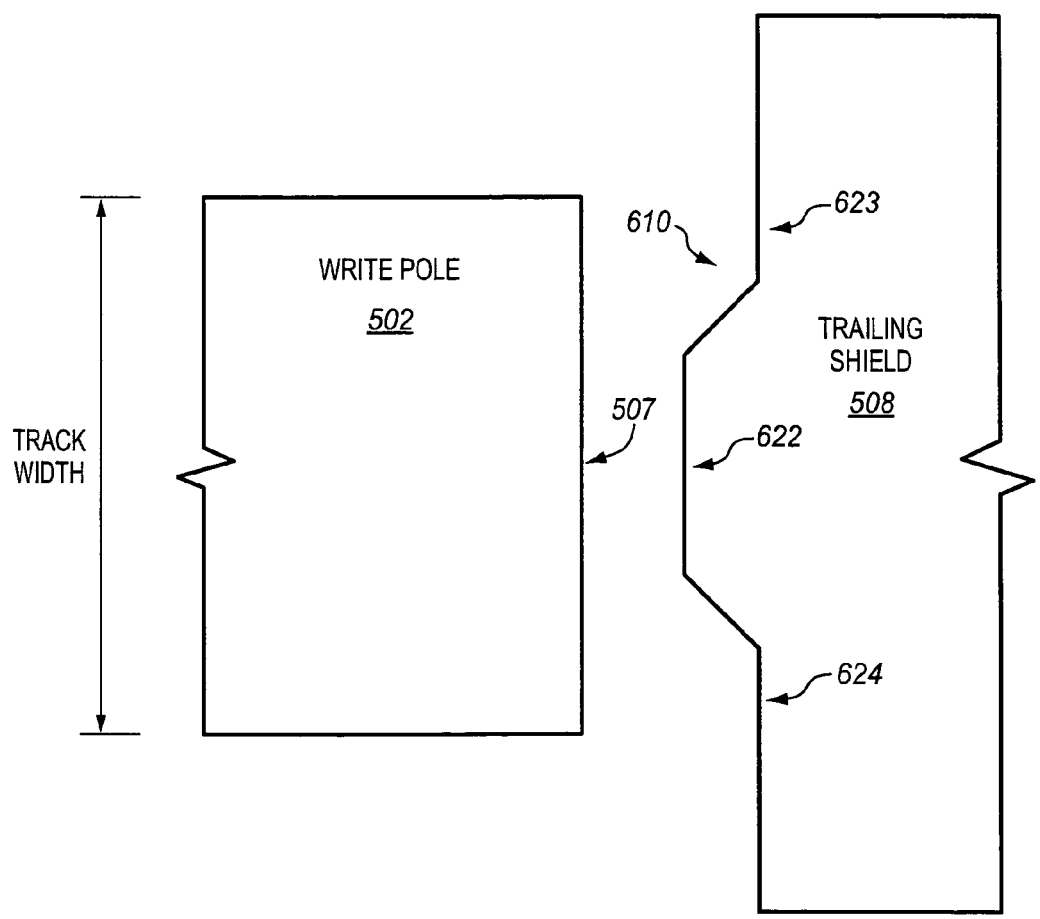
FIG. 10 illustrates a write pole and a trailing shield of a write element as viewed from the ABS of the write element in another exemplary embodiment.

FIG. 10 illustrates write pole 502 and trailing shield 508 of write element 500 as viewed from the ABS of write element 500 in another exemplary embodiment. In this embodiment, leading side 610 of trailing shield 508 is angled between center portion 622 and track edge portions 623-624. According to the shape of leading side 610, center portion 622 of leading side 610 once again has less of a separation from trailing side 507 of write pole 502 than track edge portions 623-624 of leading side 610. For instance, the separation between center portion 622 and trailing side 507 of write pole 502 may be about 25 nm, while the separation between track edge portions 623-624 and trailing side 507 of write pole 502 may be about 50 nm. The width of center portion 622 is between 40%-70% of the track width in this embodiment, but the width of center portion 622 may change as desired.

Leading side 610 of trailing shield 508 may take on other shapes than those described in the above figures. For instance, FIGS. 6, 9, and 10 show two-dimensional views of leading side 610 of trailing shield 508 from the ABS. It appears in FIGS. 6, 9, and 10 that leading side 610 is flat along the ABS. According to features and aspects herein, leading side 610 may additionally or alternatively be shaped in a third dimension, which is into the page of FIGS. 6, 9, and 10.

Figure 11:
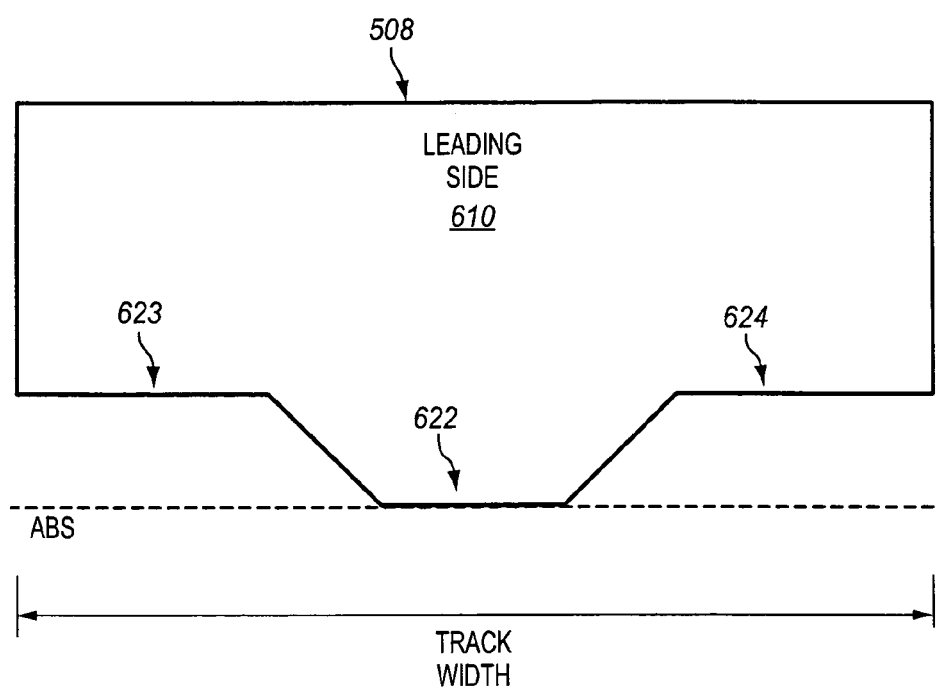
FIG. 11 illustrates a trailing shield as viewed from the trailing side of the trailing shield in an exemplary embodiment.

FIG. 11 illustrates a front view of leading side 610 of trailing shield 508 in an exemplary embodiment. FIG. 11 illustrates leading side 610 being shaped in a different dimension than those shown in FIGS. 6, 9, and 10. In FIG. 11, only trailing shield 508 is shown, but trailing shield 508 would be positioned proximate to trailing side 507 of write pole 502 as in FIGS. 6, 9, and 10. The ABS of trailing shield 508 is the bottom surface of trailing shield 508 in FIG. 11.

Trailing shield 508 is fabricated such that track edge portions 623-624 of trailing shield 508 are raised from the ABS in relation to the center portion 622. By being raised, the track edge portions 623-624 of trailing shield 508 will have more of a separation from trailing side 507 of write pole 502 than center portion 622. Once again, trailing side 507 of write pole 502 emits magnetic fields mainly proximate to the ABS, so by raising the track edge portions 623-624 away from the ABS the track edge portions 623-624 shunt less of the magnetic field at the track edges than previous trailing shields.

The leading side 610 of trailing shield 508 may additionally have a shape such as that shown in FIG. 6, 9, or 10. For instance, leading side 610 may have a convex shape in the track width as shown in FIG. 9.

Although specific embodiments were described herein, the scope of the invention is not limited to those specific embodiments. The scope of the invention is defined by the following claims and any equivalents thereof.

We claim:

1. A write element for writing to a perpendicular magnetic recording medium, the write element comprising:
 a yoke that includes a write pole and a return pole;
 the write pole having a trailing side proximate to an air bearing surface (ABS) of the write element, wherein a width of the trailing side of the write pole defines a track width; and
 a trailing shield having a leading side proximate to the ABS that faces the trailing side of the write pole;
 wherein the leading side of the trailing shield has a convex shape within the track width such that a center portion of the leading side of the trailing shield has less of a separation from the trailing side of the write pole than track edge portions of the leading side of the trailing shield.

2. The write element of claim 1 wherein the track edge portions of the leading side of the trailing shield shunt less of the magnetic field from the trailing side of the write pole than the center portion of the leading side of the trailing shield.

3. The write element of claim 1 wherein:
 a width of the center portion of the leading side of the trailing shield is between about 40%-70% of the track width.

4. A write element for writing to a perpendicular magnetic recording medium, the write element comprising:
 a yoke that includes a write pole and a return pole;
 the write pole having a trailing side proximate to an air bearing surface (ABS) of the write element; and
 a trailing shield having a leading side proximate to the ABS that faces the trailing side of the write pole;
 wherein a portion of the leading side of the trailing shield has a substantially convex shape when viewed from an ABS of the write element.

5. The write element of claim 4 wherein:
 the width of the trailing side of the write pole defines a track width; and
 the portion of the leading side of the trailing shield has the substantially convex shape within the track width.

6. The write element of claim 4 wherein track edge portions of the leading side of the trailing shield shunt less of the magnetic field from the trailing side of the write pole than a center portion of the leading side of the trailing shield.

7. A magnetic disk drive system, comprising:
 a perpendicular magnetic recording medium; and
 a recording head adapted to write to the perpendicular magnetic recording medium, the recording head having a write element comprising:
 a yoke that includes a write pole and a return pole;
 the write pole having a trailing side proximate to an air bearing surface (ABS) of the write element, wherein a width of the trailing side of the write pole defines a track width; and
 a trailing shield having a leading side proximate to the ABS that faces the trailing side of the write pole;
 wherein the leading side of the trailing shield has a convex shape within the track width such that a center portion of the leading side of the trailing shield has less of a separation from the trailing side of the write pole than track edge portions of the leading side of the trailing shield.

8. The magnetic disk drive system of claim 7 wherein the track edge portions of the leading side of the trailing shield shunt less of the magnetic field from the trailing side of the write pole than the center portion of the leading side of the trailing shield.

9. The magnetic disk drive system of claim 7 wherein:
 a width of the center portion of the leading side of the trailing shield is between about 40%-70% of the track width.

10. The magnetic disk drive system of claim 7 wherein the perpendicular magnetic recording medium comprises at least a perpendicular magnetic recording layer and a soft underlayer (SUL).

11. A write element for writing to a perpendicular magnetic recording medium, the write element comprising:
 a yoke that includes a write pole and a return pole;
 the write pole having a trailing side proximate to an air bearing surface (ABS) of the write element, wherein a width of the trailing side of the write pole defines a track width; and
 a trailing shield proximate to the trailing side of the write pole;
 wherein the trailing shield has a convex shape within the track width such that the trailing shield shunts less of the magnetic field from the trailing side of the write pole towards the track edges as compared to the center of the trailing shield.

12. The write element of claim 11 wherein:
 the trailing shield includes a leading side that faces the trailing side of the write pole; and
 the leading side of the trailing shield has the convex shape such that a center portion of the leading side of the trailing shield has less of a separation from the trailing side of the write pole than track edge portions of the leading side of the trailing shield.

* * * * *